US012500841B2

(12) United States Patent
Ubertini et al.

(10) Patent No.: US 12,500,841 B2
(45) Date of Patent: Dec. 16, 2025

(54) DEVICE, METHOD AND PROGRAM FOR COMPUTER AND SYSTEM FOR DISTRIBUTING CONTENT BASED ON THE QUALITY OF EXPERIENCE

(71) Applicant: SKY ITALIA S.R.l., Milan (IT)

(72) Inventors: Gabriele Ubertini, Milan (IT); Emanuele Vinci, Milan (IT)

(73) Assignee: SKY ITALIA S.r.l., Milan (IT)

( * ) Notice: Subject to any disclaimer, the term of this patent is extended or adjusted under 35 U.S.C. 154(b) by 18 days.

(21) Appl. No.: 17/613,026

(22) PCT Filed: May 20, 2020

(86) PCT No.: PCT/IB2020/054763
§ 371 (c)(1),
(2) Date: Nov. 19, 2021

(87) PCT Pub. No.: WO2020/234788
PCT Pub. Date: Nov. 26, 2020

(65) Prior Publication Data
US 2022/0248103 A1  Aug. 4, 2022

(30) Foreign Application Priority Data
May 20, 2019  (IT) .................. 102019000007037

(51) Int. Cl.
H04L 47/24  (2022.01)
H04L 43/08  (2022.01)
(Continued)

(52) U.S. Cl.
CPC ............ H04L 47/24 (2013.01); H04L 65/612 (2022.05); H04L 65/752 (2022.05); H04L 65/80 (2013.01);
(Continued)

(58) Field of Classification Search
CPC ........... H04N 21/6373; H04N 21/2402; H04N 21/2662; H04N 21/44209; H04L 65/80;
(Continued)

(56) References Cited

U.S. PATENT DOCUMENTS

2009/0144792 A1* 6/2009 Fielibert .......... H04N 21/23608
725/116
2009/0241156 A1* 9/2009 Nishida .............. H04N 21/4135
725/116
(Continued)

FOREIGN PATENT DOCUMENTS

EP    1 535 130 A2     6/2005
JP    4282258 B2 *     6/2009   ....... H04N 21/23605
(Continued)

OTHER PUBLICATIONS

International Search Report and Written Opinion for International Application No. PCT/IB2020/054763, mailed Sep. 2, 2020.

Primary Examiner — Brian P Yenke
Assistant Examiner — Akshay Doshi
(74) Attorney, Agent, or Firm — Wolf, Greenfield & Sacks, P.C.

(57) ABSTRACT

A method for distributing, by a content distribution device and by a communication network, at least one audiovisual service to a user terminal associated with a network user point. The method including the steps of: transmitting, to said network user point, at least a first service and a second service, said second service comprising an audiovisual service intended for the fruition while it is transmitted to the network user point; determining a reception performance index relating to said network user point based on telemetry data; determining a maximum transmission rate for said first service based on said reception performance index; in which transmitting comprises transmitting, by said content distri-
(Continued)

bution device, said first service at a transmission rate not higher than said maximum bitrate.

11 Claims, 7 Drawing Sheets

(51) Int. Cl.
| | |
|---|---|
| *H04L 65/612* | (2022.01) |
| *H04L 65/752* | (2022.01) |
| *H04L 65/80* | (2022.01) |
| *H04N 21/24* | (2011.01) |
| *H04N 21/2662* | (2011.01) |
| *H04N 21/442* | (2011.01) |
| *H04N 21/6373* | (2011.01) |

(52) U.S. Cl.
CPC ..... *H04N 21/2402* (2013.01); *H04N 21/2662* (2013.01); *H04N 21/44209* (2013.01); *H04N 21/6373* (2013.01); *H04L 43/08* (2013.01)

(58) Field of Classification Search
CPC ... H04L 43/0894; H04L 43/12; H04L 65/612; H04L 65/752; H04L 43/08; H04L 47/24; H04L 47/25; H04L 47/263
See application file for complete search history.

(56) References Cited

U.S. PATENT DOCUMENTS

| | | | | |
|---|---|---|---|---|
| 2013/0344960 | A1* | 12/2013 | Perry | ............... A63F 13/77 463/32 |
| 2015/0026749 | A1 | 1/2015 | Bringuier et al. | |
| 2015/0346832 | A1* | 12/2015 | Cole | ............... H04N 19/39 345/156 |
| 2019/0327281 | A1* | 10/2019 | Asnis | ............... H04L 67/52 |
| 2020/0152234 | A1* | 5/2020 | Sharma | ............... H04N 21/23439 |

FOREIGN PATENT DOCUMENTS

| | | | | |
|---|---|---|---|---|
| WO | WO-0221834 A1 * | 3/2002 | ......... | H04L 29/06027 |
| WO | WO 2014/147538 A1 | 9/2014 | | |
| WO | WO 2015/084000 A1 | 6/2015 | | |
| WO | WO-2015200484 A1 * | 12/2015 | ......... | H04N 21/2356 |

* cited by examiner

DEVICE, METHOD AND PROGRAM FOR COMPUTER AND SYSTEM FOR DISTRIBUTING CONTENT BASED ON THE QUALITY OF EXPERIENCE

CROSS-REFERENCE TO RELATED APPLICATIONS

This Application is a national stage filing under 35 U.S.C. § 371 of International Patent Application Serial No. PCT/IB2020/054763, filed May 20, 2020, which claims priority to Italian Patent Application No.: 102019000007037, filed May 20, 2019. The contents of these applications are incorporated herein by reference in their entirety.

FIELD OF THE INVENTION

The present invention relates to a method, a content distribution device, a computer program, and a computer program support for distributing at least one audiovisual service to a user terminal associated with a network user point.

BACKGROUND OF THE INVENTION

Over-The-Top (OTT) services for transmitting audiovisual content are used increasingly, also instead of IPTV techniques. Typically, these OTT services use http streaming protocols. Nevertheless, as OTT flows are conveyed on a network, (for example the Internet) that is typically not administered by the content provider, it becomes difficult to manage the quality of service (QoS) in the delivery of the contents.

For example, in order to manage the delivery quality of a real-time video signal on the Internet, assignment techniques of different priority are used for assigning to the different data/video flows and less important traffic is rejected if network congestion occurs (congestion prevention) techniques.

However, these techniques do not allow a high QoS to be reached and/or network resources to be exploited properly.

SUMMARY OF THE INVENTION

The object of the present invention is to improve currently known solutions and to overcome at least one or more of the problems of the prior art. The object of the protection is defined by the appended claims.

A1. More in particular, a first aspect of the invention provides a method for distributing by a content distribution device and by a communication network at least one audiovisual service to a user terminal associated with a network user point the method comprising the steps of transmitting (S10) to said network user point at least a first service and a second service, said second service comprising an audiovisual service intended for the fruition while it is being transmitted to the network user point; determining (S20) a reception performance index relating to said network user point based on telemetry data; determining (S30) a maximum transmission rate for said first service based on said reception performance index; in which transmitting (S10) comprises transmitting, by said content distribution device, said first service at a transmission rate not higher than said maximum transmission rate.

A2. The method of aspect A1, wherein determining (S20) said maximum transmission rate comprises determining said maximum transmission rate also based on a predetermined transmission rate associated with the second audiovisual service.

A3. The method according to one of the preceding aspects, wherein determining (S20) said maximum transmission rate for said first service comprises modifying said maximum transmission rate based on the reception performance index.

A4. The method according to one of the preceding aspects, wherein determining (S20) said maximum transmission rate for said first service comprises decreasing or increasing said maximum transmission rate in correspondence with a decrease or, correspondingly, an increase of the performance index.

A5. The method according to one of the preceding aspects, wherein determining (S20) said reception performance index comprises determining said reception performance index based on reception telemetry data.

A6. The method according to aspect A5, wherein said reception telemetry data are collected at one or more user terminals associated with said network user point.

A7. The method according to one of the preceding aspects, wherein the first service is a service intended for deferred fruition.

A8. The method according to one of the preceding aspects, wherein the performance index is determined at one of a terminal associated with the network user point and a network device.

A9. The method according to one of the preceding aspects, comprising a step of setting the maximum transmission rate for the first service in correspondence with a transmission unit of the distribution device.

A10. In a second aspect of the invention, an entity is provided for distributing, by a communication network, at least one audiovisual service to a user terminal associated with a network user point, the entity comprising a transmission unit (100; or transmitting means) configured to transmit, to said network user point, at least a first service and a second service, said second service comprising an audiovisual service intended for the fruition while it is being transmitted to the network user point; a processor (300, or processing means) configured to determine a maximum transmission rate for said first service based on a reception performance index relating to said network user point, said reception performance index determined based on telemetry data; wherein the transmission unit (100) is configured to transmit said first service at a bitrate not higher than said maximum transmission rate.

A11. The entity according to aspect A10, wherein said processor (300) is configured to determine said maximum transmission rate also based on a predetermined transmission rate associated with the second audiovisual service.

A12. The entity according to one of the aspects A10 to A11, wherein said processor (300) is configured to modify said maximum transmission rate based on the reception performance index.

A13. The entity according to one of the aspects A10 to A12, in which said processor (300) is configured to decrease or increase said maximum transmission rate in correspondence with a decrease, or correspondingly increase of the performance index.

A14. The entity according to one of the aspects A10 to A13, wherein said reception performance index is determined based on reception telemetry data.

A15. The entity according to one of the aspects A10 to A14, wherein said reception telemetry data are telemetry data collected at one or more user terminals associated with said network user point.

A16. The entity according to one of the aspects A10 to A15, wherein said processor (300) is configured to determine said reception performance index based on telemetry data received from a reception unit.

A17. The entity according to one of the aspects A10 to A16, the entity further comprising a reception unit (or reception means) for receiving at least one of the reception performance index and the telemetry data.

A18. The entity according to one of the aspects A10 to A17, wherein the first service is a service intended for deferred fruition.

A19. The entity according to one of the aspects of A10 to A18, wherein the performance index is determined at one of a terminal associated with the network user point and said network device.

A20. The entity according to one of the aspects A10 to A19, comprising a configuration unit (or configuration means) suitable for setting, in the entity (or in the distribution device, and preferably a transmission unit comprised in the entity or in the distribution device), the maximum transmission rate for the first service in correspondence with said network user (i.e. the maximum rate is preferably limited for the first service and for the user, not comprehensively for all users; in other words the limitation is specific or intended specifically for said user. Again in still other words, the maximum transmission rate is used individually for said network user).

A21. A system comprising an entity according to any one of aspects A10 to A20, and at least one user terminal connectable to this entity by a communication network.

A22. A computer program configured to execute, when said program is run on a computer, all the steps according to any one of the method aspects A1 to A9.

A23. A support for supporting a computer program set up to execute, when said program is run on a computer, all the steps according to any one of the method aspects A1 to A9.

LIST OF FIGURES

DETAILED DESCRIPTION

In networks like the Internet, it is difficult to transmit audiovisual services of appropriate quality because such networks do not permit thorough control of the QoS in the delivery of content to network users, especially in the presence of streaming based on http streaming protocols. For this reason, such networks are also often called unmanaged networks. The inventors have nevertheless devised a mechanism to permit the control of the division of the band between different services supplied to the same network user so as to permit the delivery (and thus fruition by the user) of at least one of said services at an appropriate quality level.

Figure 1:
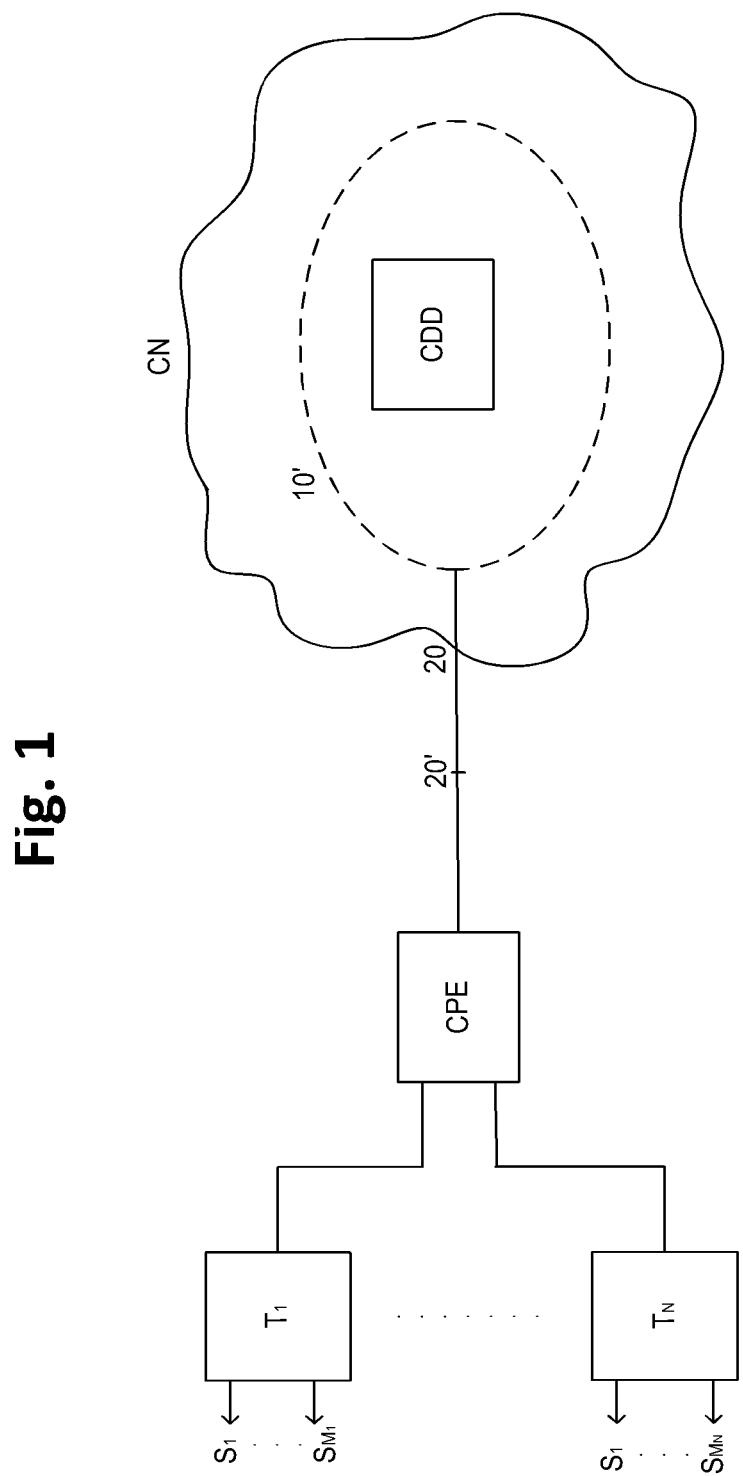
FIG. 1 is a block diagram of a system to which the present invention can be applied.

FIG. 1 is a block diagram of a system to which the present invention can be applied. The system comprises a communication network CN, customer premise CPE, a distribution device CDD, and one or more user terminals $T_1 \ldots T_N$ associated with the CPE. The connection 20 constitutes the connection between the CPE and the network. The connection 20 between the network and CPE can be wireless (UMTS, LTE, 5G, WiMax, etc.) or cabled (copper, fibre, etc.).

Although indicated in the figure, the CPE is not strictly necessary: in fact in the case for example of a single terminal $T_1$ of a mobile user, there is no CPE because the terminal can connect directly to the network by a wireless connection. Likewise, if the terminal is a Set Top Box STB, this can be connected directly to the network without the need for a CPE. Broadly speaking, a mobile terminal like a smartphone or a fixed device like an STB can be viewed both as a terminal that is connected to the network without CPE and as a CPE itself as it is possible to connect other devices (for example by tethering, Bluetooth, WLAN/WiFi, etc.) to this terminal or STB.

In all cases, point 20' is present to show the separation between the communication network CN and one or more user terminals $T_1 \ldots T_N$ and thus represent an interface between the communication network and the one or more user terminals. This interface or point 20' will also be called the network user point (network subscription point) below to indicate that it is the point in which the network delivers services to one or more user devices associated with the same user (i.e. the user means the set of terminals that share the same access to the network).

Each of the terminals can supply to the respective user one or more services S ($S_1 \ldots S_{M1}$ for the terminal 1, and so on for the other terminals). The figure indicates any number of terminals, and any number of services that can be supplied by each terminal, since the invention is not limited to a specific number of terminals or respective services (in the figure, N can be a value the same as or greater than 1; each of the $S_{M1} \ldots S_{MN}$ is greater than or the same as 1, and the various $S_{M1} \ldots S_{MN}$ can be the same or different). Examples of services include: IPTV audiovisual services, OTT (Over-The-Top) audiovisual streaming services, audiovisual services for deferred viewing (for example, recording services, or VOD for deferred viewing), data services comprising applications, data services comprising information to be displayed on the screen and/or associated with an application).

As is also explained below, the distribution device is an entity that is able to distribute at least one of the services intended for at least one of the terminals $T_1 \ldots T_N$. This entity can consist of a server, of a CDN (indicated by 10' in the figure), of a CDN selector that determines which of a plurality of CDNs will deliver the service/services requested, etc. or of a combination thereof.

Figure 2:
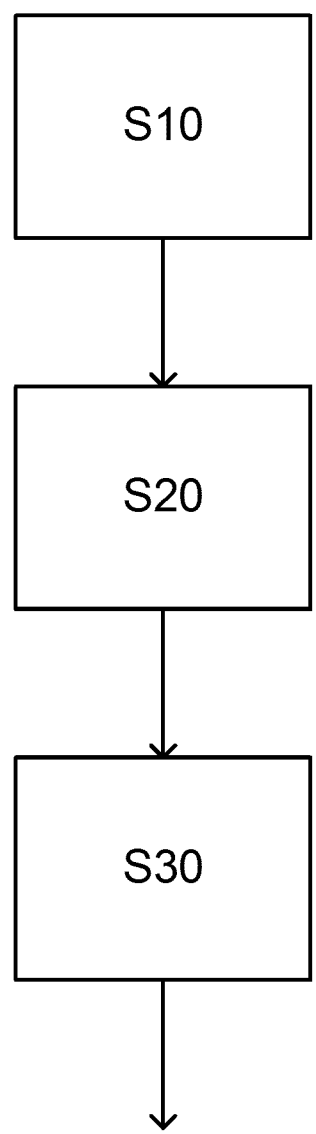
FIG. 2 is a flow diagram illustrating a method according to a first embodiment of the present invention.

With reference to FIG. 2, a first embodiment will now be illustrated relating to a method for distributing, by a communication network, at least one audiovisual service to a user device associated with a network user point (called below also more simply user). The first service and the second service can be transmitted by the same server or by different servers (thus in general by a distribution device, which can include one or more servers). Audiovisual service means a service that comprises at least one of an audio service and video service; optionally, the audiovisual service can contain data, these data preferably relating to the audiovisual service. In one example, the data can include an application executed by the user device (also called a terminal), information preferably relating to the audiovisual content and to be displayed to the user, a combination thereof etc.

One or more terminals are associated with the network user point, where a network user point means a separation point between the network and these terminals. For example, these terminals associated with the network user access the network by using the same IP (public) address. In other words, the network user point comprises an interface between the network and terminals of various users, and enables the users to access the same network. Examples of network user points comprise an ADSL or optic fibre user through which one or more terminals can be connected to a network, such as for example the Internet, by customer premise equipment (CPE). Examples of CPE for a fixed user include an ADSL or optic fibre modem. In the case of a mobile user such as for example UMTS, LTE, 5G, WiMax etc., a CPE is not strictly necessary; typically, behind the mobile connection of a user there is only one terminal such as a smartphone or Tablet, although it is possible to associate therewith other terminals that access the mobile network via the terminal. In another example, the mobile user is associated with a router (also a wireless router) to which different devices connect to access the network.

In step S10 at least a first service and a second service are transmitted to the network user point. The first and the second service can be intended for the same terminal or for two different terminals associated with the user, which terminal/terminals thus receive the respective service by the network user point: for example, the terminal can be connected to a fixed or mobile user to receive both services; in another embodiment, a first terminal receives the first service, and a second terminal receives the second service (any type of terminal can be used; in the case of two or more terminals, the terminals are associated with the same user). The second service comprises an audiovisual service intended for displaying to the user (fruition) while it is being transmitted to the network user point, i.e. during reception (in other words, the content is presented to the user, for example displayed on a screen of a user device, while the content is being received); this audiovisual service includes a streaming service using protocols such as for example HLS, MPTEG-DASH, smooth streaming, etc. (the invention is not limited to a specific streaming protocol, but in fact applies to any http-based streaming protocol and that is not able by its nature to control the distribution of flows). It can be said that the second content is for direct display (while the content is transmitted to the network, independently of whether it is a live program or not) to distinguish the second content from other contents that are on the other hand for a deferred display. In other words, the second content corresponds to a content as commonly transmitted on a terrestrial or satellite channel: it is displayed while it is transmitted.

In step S20, a reception performance index is determined of the performance that it is desired to obtained for each network user point based on telemetry data. Preferably, the reception performance index indicates a level of reception quality at the user (i.e. on the user/network interface) of one or more services transmitted by the distribution device. Also preferably, the performance index indicates the band or the transmission rate that is available at the user interface, at least at the first and/or second service. In other words, the performance index indicates the quality of the services as supplied by the distribution device and as perceived and received at the network user point. Preferably, the telemetry data are data collected at the terminal/terminals associated with the network user point to which the services are delivered. Preferably, the telemetry data can optionally also include data detected in network (i.e. devices that are not directly usable by the user and in particular by user applications) and combined together with those detected by the terminals to obtain the performance index. The performance index can be a single index or a set of performance parameters representing together the performance index. According to some examples, the content distribution device comprises a server that is able to distribute content, a CDN, a CDN selector, in general any other network device set up to transmit contents to a user, or a combination thereof. The telemetry information is preferably detected at the devices associated with the user and/or the CPE, and sent to the distribution device and/or to a server set up to process the information (as for example illustrated below), or to a combination thereof. Examples of telemetry data include measuring the instantaneous and/or average bitrate of one or more audiovisual services and/or data services received from a terminal; information on rebuffering such as for example the number of rebuffering occurrences, the amount of rebuffered data, the number of network errors, start-up time of the video service, number of maximum/average concurrent sessions, number of sessions with errors, most requested CDN, etc. or a combination thereof. In general, the telemetry data refer to at least one service transmitted by the distribution device to a user device connected to the user, preferably to all the services supplied to the user by the content distribution device. In this case, the telemetry data on services transmitted by other distribution devices (but received from devices connected to the same user) might not be included; in this case, the telemetry analysis could be limited only to some or all the services supplied by a single distribution device, and the reception performance indicate the level of quality at which the services supplied by the distribution device are received at the user interface/i-network. In another embodiment, the telemetry data comprise electronic information on a plurality or preferably all the services delivered to one or more of the devices associated with the user by a plurality of distribution devices, regardless of the origin or the distribution device that transmits the data. In this case, it is possible to have a total indication of the reception performance at the user, especially if all the services supplied by all the supply devices to the user are included. It is nevertheless pointed out that it is not necessary to record the performance index per all the services supplied by all the service distributors. In fact, as pointed out by the inventors, it is possible to improve the quality of communication and fruition of the second service even if only the telemetry data on one or more services supplied by a single distribution device are analysed; this improvement increases if the telemetric data of all the services supplied by the single distribution device are considered, and further increases if all the services come from a single distribution device.

In step S30, a maximum transmission rate (maximum bitrate) is determined for the first service based on the reception performance index. In other words, based on the quality at which the services are received at the user by the distribution device, it is possible to determine what the maximum band is that it is desired to assign to the first service, so as for example to enable the second service to be received at a satisfactory quality. The maximum transmission rate can be determined dynamically, for example upon the expiry of a certain timer or at predetermined instants of time, or determined when a trigger condition occurs (for example, when one or more telemetry parameters are in a predetermined relation compared with respective threshold values). In one example: the telemetry data are collected on the user side and sent (by the CPE or by one or more of the devices connected to the CPE) to the transmitting side (for example inside an http message separated from the http messages of the streaming protocol, or by http messages defined ex-novo in a new version of an http streaming protocol); the transmitting side then determines the maximum rate to be applied to the first service. In another embodiment: the user side sends the performance index to the transmitting side. In still another embodiment: the user side (for example, the CPE or one or more of the devices connected to the CPE) sends to the transmitting side an indication of the maximum rate to be applied to the first service intended for this user, calculated based on the performance index. The transmitting side then transmits the first service (individually) to the first user by using the thus individually determined maximum transmission rate for this user. These examples can be combined, also with further examples that are supplied below.

The step S10 can further comprise transmitting, by the content distribution device, the first service at a transmission rate not higher than the determined maximum transmission rate. In other words, a cap is determined at the available band for the first service, which band depends on the reception quality at the user. For example, if the performance index indicates a reception quality decrease, the band of the first service can be so reduced that enough band remains available for the second service. As mentioned above, the mechanism of the present invention enables the band to be shared between the services supplied to the same network user; accordingly, the maximum transmission rate is applied for the first service to the specific user for which the performance index has been determined. In other words, the transmitting side limits the transmission rate (bitrate) at the first service to the single network user. In fact, the transmission rates for other users can be, and typically are, independent of the determined transmission rate for the network user in question.

It should be noted that FIG. 2 and what has been set out above are not to be understood to be a temporary sequence in which the steps are to be executed. In particular, step S20 of determining a performance index can be executed before the transmission (step S10) starts, for example by using telemetry data of the last session used, or an average statistic of the telemetry data of a preceding interval of time. Further, the transmission can start with a predetermined maximum rate (for example, the last calculated value, a value stored on the distribution device, etc.), also without any bitrate cap, etc.; after the transmission has started, the maximum rate can be calculated and be applied to the transmission of the first service. Further, regardless of the temporal order of steps S10 and S20, step S20 of determining the performance index can be repeated while the transmission continues and based on this determination the transmission can vary the maximum transmission rate of the first service dynamically, for example by taking into account refreshed telemetry data that produce a refreshed performance index.

It should be noted that the reception performance index can be determined based on one or more of the telemetry parameters included in the telemetry information, or based on a combination thereof. As mentioned above, the performance index can be represented by a single parameter representing the reception quality or by a combination or aggregation of different parameters indicating the reception quality; for example, the index can be represented by a KPI (Key Performance Indicator) or a KPI combination (also weighted), each of said KPIs determined based on telemetry information. The telemetry data are preferably detected at the terminals, for example by agents or probes (comprised for example in the application that supplies the service to the user in the operating service of the terminal etc) that measure parameters of the communication quality. These parameters can be used by the terminal to calculate a performance index and/or the maximum bitrate of the first service, which are then sent to a network device; alternatively, the telemetry data are sent to a network device for subsequent processing.

Optionally, to what is said above or below, transmitting said first service at a transmission rate not higher than said maximum transmission rate comprises limiting the transmission (based on this maximum transmission rate) of said first service individually to said specific user, in which preferably the limiting is set based on at least one (or any combination) between the address (for example, IP address) assigned to this user, an identification of this service (for example a service identification inside the services supplied by the server, or inside services supplied inside a connection), an identification of a connection to this user, identification of a connection port, etc. Individually, reference is made to the fact that the limitation of the rate is specific (thus individual) for this user. In one embodiment: if a server supplies the first and second service, the first service can be limited, for example by setting the maximum rate at the service identification (assigned for example only to that user), or at the IP address of the user and a service identification (not necessarily unique inside the services supplied by the server). In another example in which a first server send the first service and a second server sends a second service, the transmission rate of the first service can be capped by setting (individually) the maximum rate at the first server and the address assigned to the user.

Optionally, in the method of this embodiment, determining (S20) the maximum transmission rate comprises determining the maximum transmission rate also based on a predetermined transmission rate associated with the second audiovisual service. For example, the predetermined transmission rate can include a minimum transmission rate required by the second service, or a desired transmission rate for the second service. Preferably, this determination can also be based on the maximum rate that is currently in force for the first service, and optionally for the current transmission rate of the second service. Accordingly, starting with the performance index and the predetermined rate, it is possible to determine the maximum rate that can be allocated to the first service (for the single network user under examination). In one embodiment: if, for a certain user, the minimum rate for the second service is 3 mbps, the maximum current rate for the first service is 3 mbps, and the performance index indicates a deterioration in quality (i.e. it reflects the fact that the available band for the two services is less than 6 mbps), the maximum rate of the first service is reduced to 2 mbps, to enable the second service to be received correctly.

Optionally, in the method of this embodiment, the step (S20) of determining the maximum transmission rate for the first service can comprise modifying the maximum transmission rate based on the reception performance index. In this manner, it is possible to achieve dynamic control of the transmission, so as to permit a high level of delivery of the second service also in the presence of variable transmission conditions. The dynamic control can be obtained in various ways as mentioned above (timer, predetermined intervals, trigger, etc.) as in other examples detailed below.

Optionally, in the method of this embodiment, the step (S20) of determining the maximum transmission rate for the first service comprises decreasing or increasing the maximum transmission rate in correspondence with a decrease, or, correspondingly, increase of the performance index. In this manner, it is possible to ensure that the second service continues to have a substantially unaltered band at its disposal. The correlation between the increase/diminution in performance index and increase/diminution can be made by controls, also at several levels, of the telemetry parameters, as disclosed below in the examples.

Optionally, in the method of this embodiment, the step (S20) of determining the reception performance index comprises determining the reception performance index based on reception telemetry data, i.e. of telemetry data relating to the network user, or in other words telemetry data that indicate the level of reception quality at the network user (or at least one device associated with the network user). For the telemetry data and calculating the index based on the telemetry data, reference is made to what has been stated above and to the examples that follow below. In general, telemetry data are data relating to measurements of the quality of reception and/or transmission, in which "tele" indicates that they are remote with respect to another device; for example, they are detected at the user and used on the (preferably, but not necessarily, transmitted to the) transmitting side to limit the transmission rate of a service.

Optionally, in the method of this embodiment, the reception telemetry data are collected at one or more user terminals associated with said network user point. Preferably, the telemetry data refer to services supplied by the distribution device to terminals of the same user. The telemetry data can be used by one of the terminals of the user and/or by the CPE, and used locally by one of the terminals or by the CPE to calculate the performance index that is sent to a network device set up to calculate the maximum rate to be applied to the first service. Alternatively, a terminal of the user and/or the CPE can calculate the maximum transmission rate for the first service, and send the maximum transmission rate to the supply device so that the supply device supplies the first service without exceeding this maximum rate. In another example, the telemetry data are transmitted by each terminal to a network device (which thus does nothing but collect and send the data to a network device, simplifying the operation of the user device), which processes the data further to determine the performance index and optionally also the maximum rate, and/or collects the data to send the data to another device set up to process these telemetric data. Optionally, it is possible to combine the telemetric data detected at the user terminals with telemetric data detected by network devices, as also illustrated below in the examples. It should be noted that if the terminals themselves calculated the performance index, it could be necessary to have a dialogue between the terminals so that the telemetry data are exchanged that are necessary for calculating the index (in one example, a set of terminals could be organized into a structure with a master device and other slave devices, in which the master receives data from all the slaves to calculate the performance index; the received data include for example the type of service supplied, optionally from which distribution device, and to which band). In the case of the network side calculation, the user devices transmit the telemetry data, which are processed in the network.

Optionally, in the method of this embodiment, the first service is a service intended for deferred fruition. In other words, a service for deferred fruition is a service that is not used by the user while the data corresponding to the service are being transmitted; in fact, it is a service used by the user at a subsequent point of time and/or independently of when the service is transmitted to the network. Examples of this service include a recording service for example for the currently viewed content (wherein for example audiovisual content is downloaded to be viewed at a later time); a VOD service to be viewed after the content has been completely downloaded, or after a substantial part of the content has been downloaded so as to have a sufficient buffer in view of the fact that the band for this service can be further limited during transmission; a data service such as for example downloading a software update of the terminal or of an application; the download of an application; the download of data relating to an application and/or to a displayed or downloaded audiovisual content; etc. It is accordingly possible to send all the data on the deferred service (for example, without having to reduce the resolution and/or without having to omit parts) without having to meet strict time constraints (for example real time constraints) on delivery times.

Optionally, in the method of this embodiment, the performance index is determined at one of a terminal associated with the network user point and a network device. Reference is made to what has been set out above and below.

Optionally, the method of this embodiment comprises a step of setting the maximum transmission rate for the first service in correspondence with a transmission unit of the distribution device. In other words, the distribution device is configured in such a manner that it limits the supply of the first service to the supplied maximum transmission rate. In fact, the receiving side could require the first service at a very high speed; nevertheless, the supply device will send the first service at a bitrate that is not greater than the determined maximum rate, owing to the aforesaid configuration. In one example: let it be supposed that the distribution device is a server for the distribution of audiovisual streaming services (for example a nginx server); in the prior art, this server has a static limit to limit the maximum supplied band. Nevertheless, this static limit can be replaced, according to the present invention, by a dynamic limit configured based on the determined maximum rate (for example, by configuring this maximum rate at the IP address of the user, and/or of an identification of the first service, etc. (as also illustrated above). Alternatively or in combination, the pre-existing static limit can be updated dynamically. In particular, it is possible to configure the transmission rate for a given service (for example the first service) to a specific network user (the network user for which the performance index has been determined); in this manner, it is thus possible to divide a band accurately for a single user.

Optionally, the determining step (S30) of determining the maximum transmission rate comprises determining the maximum transmission rate also based on an indication of the network transmission rate available to the network user point. The available network transmission rate is the transmission rate (expressed for example in bitrates, latency, etc. or a combination of these values) that the user receives at a given moment. This can be obtained by a simple speed test of the network connection as measured at the network user point. The available transmission rate, which can vary over time, can be measured repeatedly (at intervals of time, in correspondence with a timer and/or trigger conditions, etc). Accordingly, the maximum rate for the first service can be increased or decreased in correspondence with an increase or, respectively, decrease of the available transmission rate on the network.

The method and the versions thereof set out above thus enable the second audiovisual service (i.e. a service displayed while it is being transmitted) to be supplied at a high level of quality also in the presence of variable conditions of transmission quality in the network.

The above variants can be combined with one another, as is obvious to the person skilled in the art. Further, the first embodiment relates to a method according to the present invention. All the above considerations and versions apply to devices or entities such as the entity for distributing services (preferably data and/or audiovisual services) and to systems comprising the distribution device and at least one terminal, computer programs, support for computer programs, signals and other examples and embodiments as also illustrated below. Where different details are omitted for the sake of brevity, all the above remarks apply equally and/or correspondingly to what follows and vice versa.

Figure 3:
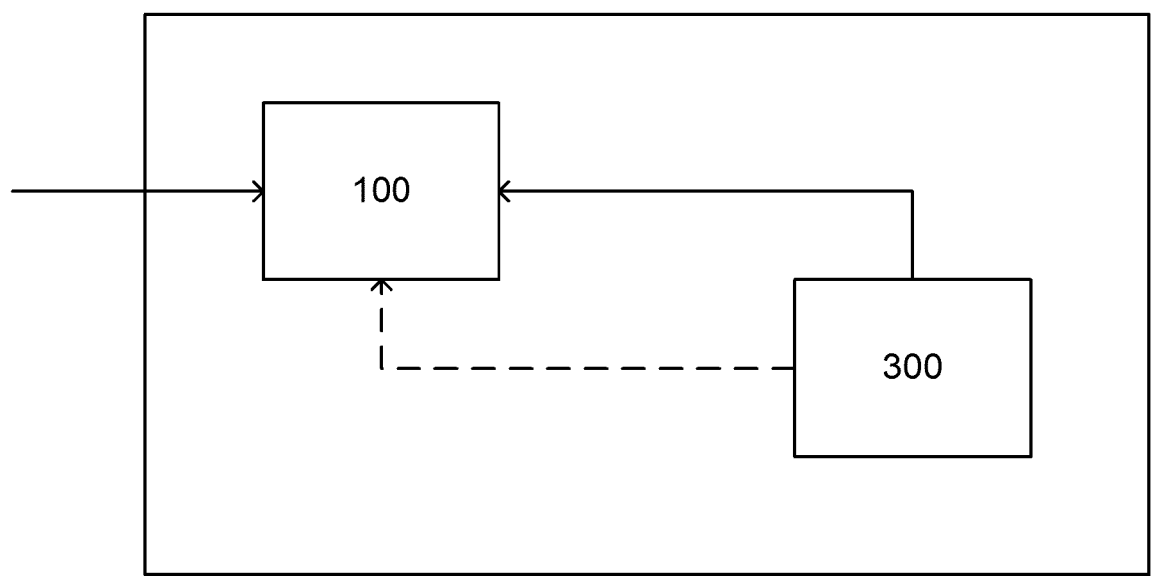
FIG. 3 is a block diagram of an entity for distributing services according to a second embodiment of the invention.

With reference to FIG. 3, a second embodiment will now be illustrated relating to an entity for distributing, by a communication network, at least one audiovisual service to a user terminal associated with a network user point. The entity comprises a transmission unit 100 and a processor 300. The transmission unit (100) is configured to transmit, to the network user point, at least a first service and a second service. The second service comprises an audiovisual service intended for fruition while it is being transmitted to the network user point. The processor (300) is configured to determine a maximum transmission rate for the first service based on a reception performance index relating (in the sense that it refers) to the network user point. The reception performance index is determined based on telemetry data. The transmission unit (100) is configured to transmit the first service at a transmission rate not higher than the maximum transmission rate. As explained above and below, the entity consists of one or more devices located on a single apparatus or distributed on several apparatuses (for example on Cloud), made of software and/or hardware (or any combination thereof).

Optionally, in the entity according to the this embodiment, the processor (300) is configured to determine the reception performance index based on telemetry data received from a reception unit (the reception unit, which is not illustrated in the figure, can be a receiver incorporated into the device, or integrated together with the transmission unit to form a transceiver).

Optionally, in the entity according to the present embodiment, the entity further comprises a reception unit for receiving at least one of the reception performance index and the telemetry data.

Optionally, the entity according to the present embodiment comprises a configuration unit that is suitable for setting, in the entity (or in the distribution device, and preferably by means of a transmission unit comprised therein), the maximum transmission rate for the first service at the user; i.e. the maximum transmission rate is set on the receiving side for the first service and for said network user.

Figure 4:
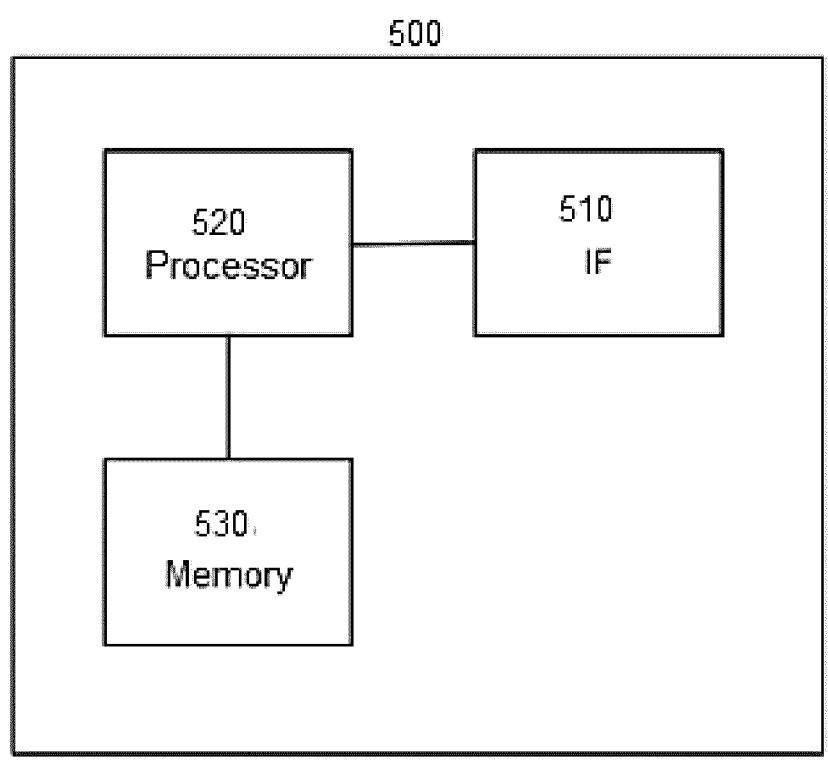
FIG. 4 is of a computer that is able to run a computer program according to an embodiment of the present invention.

FIG. 4 illustrates a block diagram exemplifying a computer (500) capable of running the aforesaid program. In particular, the computer (500) comprises a memory (530) for storing the instructions of the program and/or data necessary for the execution thereof, a processor (520) for executing the instructions and an input/output interface (510). In particular, FIG. 4 is illustrative and non limiting, because the computer can be made both in a concentrated manner in a device or in a distributed manner on several interconnected devices. For this reason, the program can be run locally on a concentrated (local) or distributed device.

According to a further embodiment, a support is provided for supporting a computer program set up to execute, when the program is run on a computer, a step or combination of steps according to the method described in the first embodiment. Examples of a medium are a static and/or dynamic memory, a fixed disk or any other medium such as a CD, DVD, Blue Ray. Comprised in the medium there is also a means capable of supporting a signal representing the instructions, including a means of cable transmission (Ethernet, lens, etc.) or wireless transmission (cellular, satellite, digital terrestrial transmission, etc.).

Figure 5A:
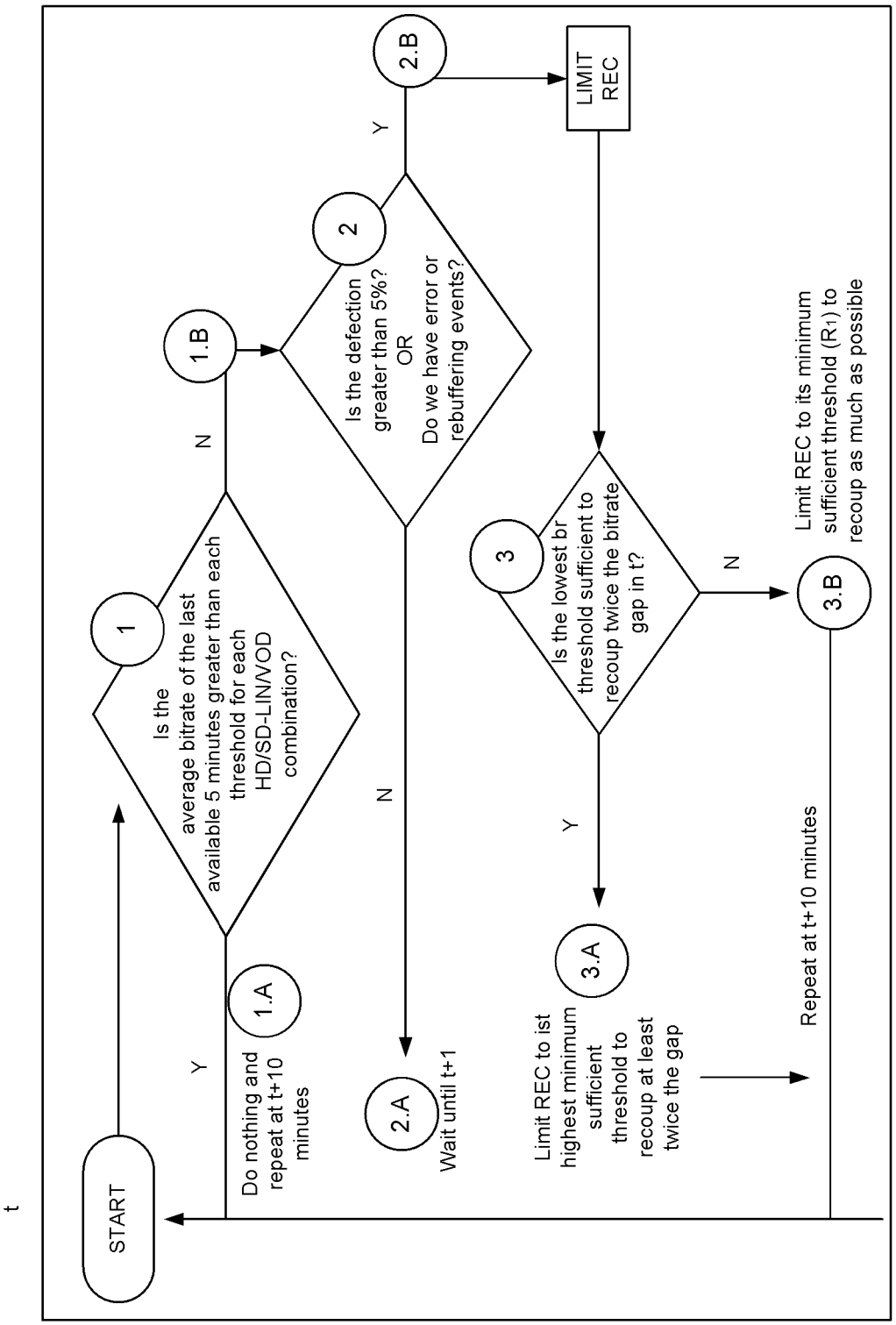
FIGS. 5a and 5B illustrate a flow diagram relating to an embodiment of the present invention.

With reference to FIG. 5A, a method is now set out illustrating operation according to the present invention. For the illustrative purposes, the method is based on the following considerations:

Statistical methods were used to analyse the historic telemetry data provided by the various terminals/STBs in a real context: for example, users can request one or more live content items and/or one or more non-live content items (recorded, software download . . . ), also simultaneously. The two units will be called 'live' and 'rec' (or REC), respectively.

Caps were determined of minimum rate (bitrate) at which live services can be seen with an acceptable QoE; for the REc services, two caps were determined, a minimum and an intermediate cap (preferably for each of the REC services), using which the time for downloading the recorded content is acceptable or good (i.e., the time for downloading the content must not be so small as to enable the content to be used in real time while it is being downloaded);

It was then decided to implement the following algorithm that is illustrative (but does not limit the invention) in order to maximize the Quality-of-Experience (QoE) using certain Key-Performance-Indicators (KPIs).

The algorithm is then explained with reference to FIGS. 5A and 5B. In detail, at an arbitrary instant of time t (predetermined or triggered by an event detected automatically or triggered manually):

Step 1):

It is ascertained whether the average bitrate detected in the last 5 minutes is greater than the predetermined threshold for each combination of services consistent with what the user is using (LIVE, REC, VOD). In the figure: "Is the average bitrate of the last available 5 minutes greater than each threshold for each combination of LIN service (i.e. linear services, for example live) and VOD (example of REC service) both standard and high resolution (SD/HD)?". The bitrate is an example of the performance index disclosed above; checking one of these caps or a combination of these thresholds (preferably also in combination with the threshold checking according to one or more of the subsequent steps) corresponds to determining the maximum rate based on the performance index.

Point 1.A:

If the threshold is not exceeded, there is a 10-minute wait before the next check (and step 1 is preferably repeated).

Point 1.B:

If the threshold is exceeded, the level 2 (step or point 2) check takes place.

Step 2):

Is the threshold is exceeded by more than 5% or error or rebuffering events occur (in general, the performance index indicates a deterioration)?

Point 2.A):
  If NO, there is a 1 minute wait before the next check Point 2.A.a):
    After 1 minute, step 1) is repeated and the second level is checked as indicated in step 2.A.a of FIG. 5B (in which step 2.A. substantially corresponds to step 1).
  Point 2.A.a.i (FIG. 5B):
    If the threshold is not exceeded, there is a 9-minute wait before the next check.
  Point 2.A.a.ii (FIG. 5B):
    If the threshold is exceeded the REC service is limited. There is a 10-minute wait until the next check.
  Point 2.B (returning to FIG. 5A, where point 2 refers to the case of an affirmative response to the question of step 2):
    If YES, the REC (limited single service) is limited.
Step 3:
  Is the lower bitrate threshold sufficient for limiting twice (re-capping) the bitrate gap?
    The subsequent choice is made to maintain the best User Experience. The lowest possible threshold is not chosen but the threshold that allows all services to be received with good quality (LIVE) and acceptable times (REC)
  Point 3.A:
    If YES, the REC is limited by the highest predefined threshold. The subsequent control is after 10 minutes.
  Point 3.B:
    If NO, the REC is limited by the predefined minimum threshold. The subsequent control is after 10 minutes.
In the example above, time values, time intervals and percentage thresholds are provided. These values are nevertheless only illustrative and non-limiting and in fact other values can apply; further, these values can be configurable and/or variable dynamically.

The following table summarizes possible KPIs (Key Performance Indicators), each of which (or a combination thereof) represents an example of the performance index described above:

| Type of service | KPI-G01 | KPI-G02 |
|---|---|---|
| Live (or linear in general) | Composite QoS KPIs Behavioural patterns frequencies | Composite-behavioural KPIs<br>Basic behavioural KPIs<br>Composite-service KPIs (LIVE)<br>Basic-service KPIs (LIVE) |
| REC | Composite QoS KPIs | Composite-service KPIs (REC)<br>Basic-service KPIs (REC) |

In particular, the KPI families that are designated for real time KPIs and for daily KPIs are summarized. In one embodiment, KPI-G01 is based on the data collecting analysis of the last 5 minutes; KPI-G02 is based on the data collecting analysis of the last 24 hours. By using information on the type of service used (live or recording) and by analysing the timestamp of the telemetry events, it is possible to reconstruct how one user (for example an STB) behaved for each minute and then segment typical patterns (for example: only live, multiple live services, use of live services during concurrent Live and Rec services, only Rec services, etc.). The table thus illustrates how it is possible to determine a KPI by combining the telemetry data collected from one or more user devices. Once the KPI has been calculated, this provides an index of how a certain service is received at a given instant of time (the index can be real time, or take into account the quality of the last 24 h). Starting from the value calculated at a given instant of time, it is thus possible to determine a performance index for example for the live or linear service, and decide whether to limit the REC service. It is pointed out that the KPI examples are only illustrative and non-limiting and that LIVE means a service that is used while it is received (an example of the second service illustrated above); the REC service is an example of the first service discussed above.

Figure 6:
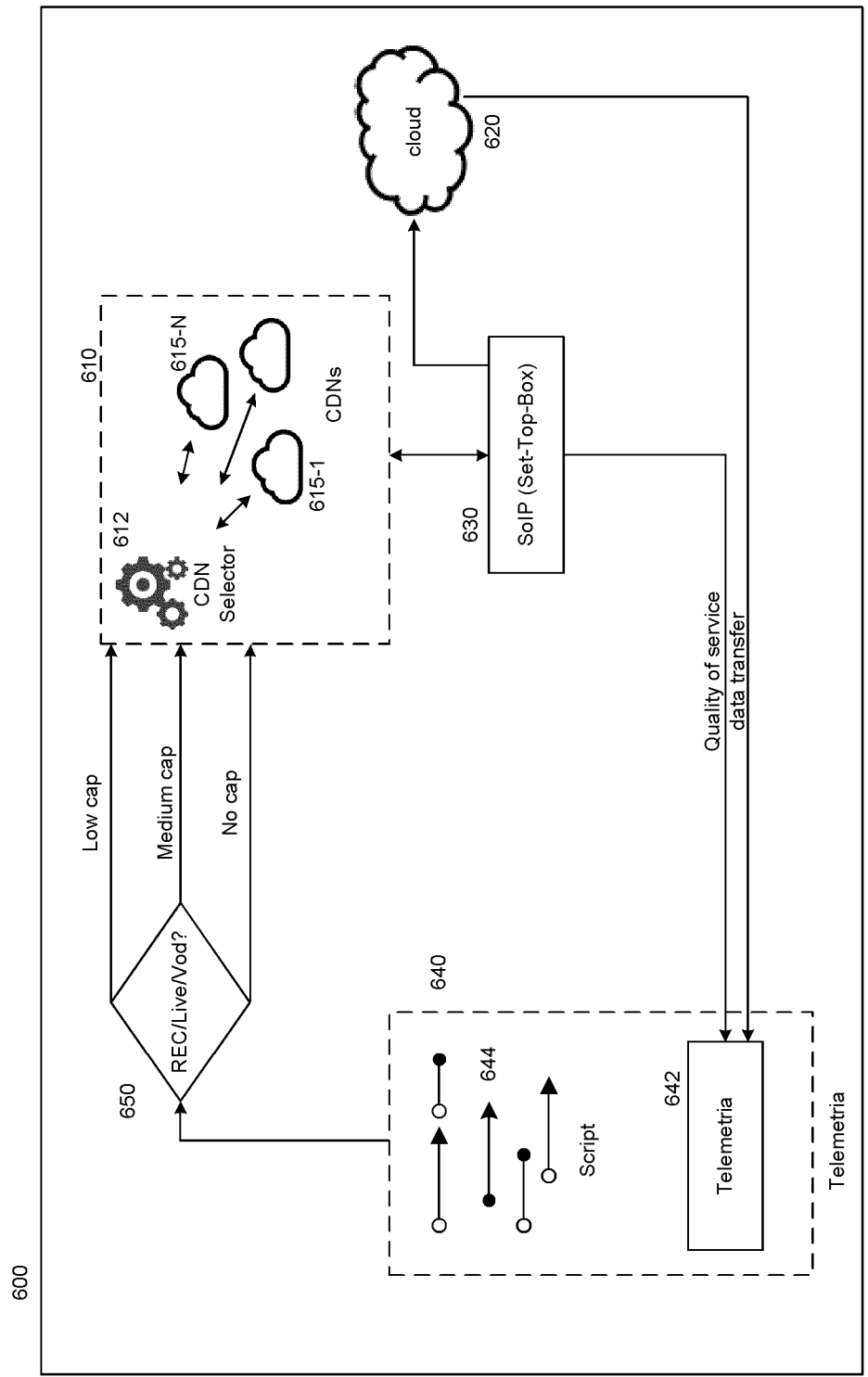
FIG. 6 is a block diagram of a system to which the present invention can be applied.

FIG. 6 is a block diagram illustrating a system to which it is possible to apply the present invention. In detail, a CDN 610 is shown, or preferably a set of CDN 615-1 . . . 615-N that are selected from a CDN 612 selector for distributing audiovisual content to a user terminal 630 such as for example an STB. Telemetry data as measured by the user device 630 (or by user devices) are sent and collected in the network (for example by a Cloud 620 and placed at the disposal of a network device 640, which can store the telemetry data in a memory or databank 642 and processed by a processor comprising instructions or a script 644 for determining a performance index. Based on the performance index, it is then decided (see 650) whether or not to limit the transmission band of one of the services. In particular, it can be decided to limit the maximum band at which the CDN (or the CDN selector) supplies the REC service or Vod (i.e. the first service discussed above). In the example, two cap levels can be established at which it is possible to limit the supply of the first service (REC, VOD, etc.). In general, also limiting the second service is conceivable, i.e. the live or linear service (the second service disclosed above), based on the performance index, especially if this second service is also distributed by the CDN 610. Further, the STB can also optionally supply information on the quality of service of data transfer to the device 640, so that this can be taken into account in determining the performance index.

Many of the embodiments and examples have been explained with reference to steps of methods or processes. Nevertheless, what has been described can also be implemented in a program to be run on a processing entity (also distributed) or on an entity the means of which are configured to execute the corresponding method steps. The entities disclosed above and their components (for example their units) can be implemented in a single device, via hardware, software or a combination thereof, or in multiple interconnected units or devices (hardware, software or a combination thereof as well). Naturally, the description set forth herein above concerning embodiments and examples that apply the principles recognized by the inventors is provided solely by way of example of these principles and therefore it should not be understood as a limitation of the scope of the invention claimed herein.

ABBREVIATIONS

T: user terminal

S: service provided by a user terminal

CPE: Customer Premise Equipment

CN: communication network

CDD: content distribution device

Figure 5B:
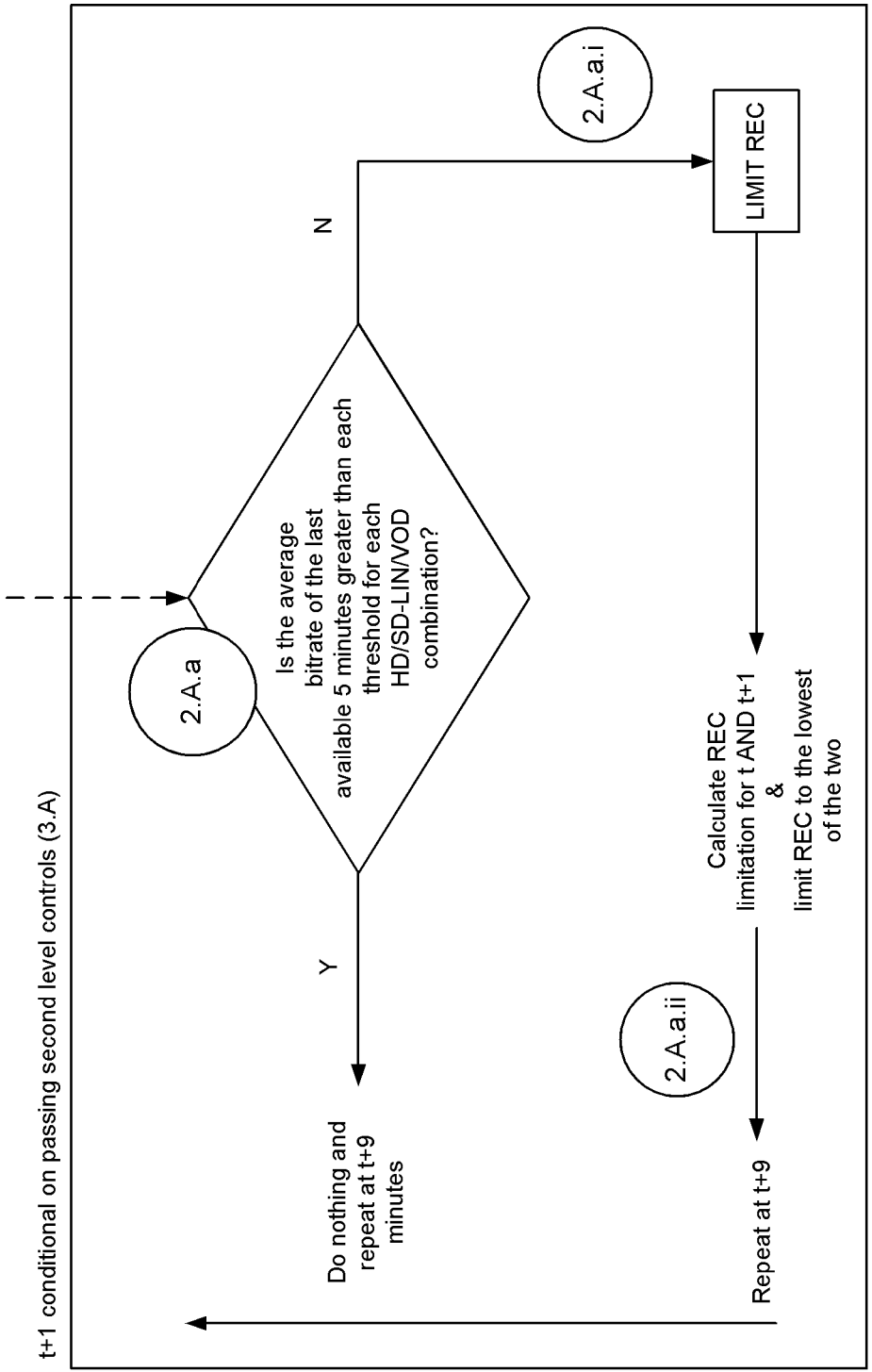

With reference to the text in FIGS. 5A and 5B:

| Point/Step | English Text | Italian Text |
|---|---|---|
| 1 | Is the average bitrate of the last available 5 minutes greater than each threshold for each HD/SD-LIN/VOD combination? | È il bitrate medio degli ultimi 5 minuti maggiore di ciascuna soglia per ciascuna combinazione HD/SD-LN/VOD? |
| 1.A | Do nothing and repeat at t + 10 minutes | Non fare nulla e ripetere al minuto t + 10 |
| 2 | Is the defection greater than 5%? OR Do we have error or rebuffering events? | È la defezione maggiore del 5%? O Vi sono errori o eventi di rebuffering? |
| 2.A | Wait until t + 1 | Aspettare fino a t + 1 |
| 3 | Is the lowest br threshold sufficient to recoup twice the bitrate gap in t? | È la soglia inferiore di br (bitrate) sufficiente per recuperare due volte il gap di bitrate all'istante t? |
| 3.A | Limit REC to its highest sufficient threshold to recoup at least twice the gap | Limitare REC alla sua soglia più alta possibile per recuperare almeno due volte il gap |
| 3.B | Limit REC to its minimum sufficient threshold (R1) to recoup as much as possible | Limitare RED alla sua soglia minima sufficiente (R1) per recuperare il più possibile |
| 2.A.a | Is the average bitrate of the last available 5 minutes greater than each threshold for each HD/SD-LIN/VOD combination? Do nothing and repeat at t + 9 minutes Calculate REC limitation for t AND t + 1 & limit REC to the lowest of the two Repeat at t + 9 | È il bitrate medio degli ultimi 5 minuti maggiore di ciascuna soglia per ciascuna combinazione HD/SD-LIN/VOD? Non fare nulla e ripetere a minuto t + 9 Calcolare limite REC per t AND t + 1 & limitare REC al minore dei due Ripetere a t + 9 |

The invention claimed is:

1. Method for distributing, from a content distribution device and by a communication network, at least one audiovisual service to a user terminal associated with a network user point, the method comprising steps of:
transmitting, to said network user point, at least a first service and a second service, said first service comprising an audiovisual service intended for deferred fruition and said second service comprising an audiovisual service intended for fruition while it is transmitted to the network user point;
when the network user point is associated with only one user terminal collecting telemetry data, receiving, from said network user point, a first reception performance index calculated at said network user point, the first reception performance index comprising an indication of a first reception quality of the second service;
when the network user point is associated with a plurality of user terminals collecting telemetry data:
receiving, from said network user point, the telemetry data collected at the plurality of user terminals associated with the network user point, the telemetry data including, for each user terminal of the plurality of user terminals, at least one of measurement on a bitrate of one or more audiovisual services received from the user terminal, information on rebuffering, a start-up time of an audiovisual service, an indication of errors, or an indication of a resolution used by the user terminal; and
determining, remote from said network user point, a second reception performance index relating to said network user point based on the telemetry data for each user terminal of the plurality of user terminals, the second reception performance index comprising the indication of the first reception quality of the second service; and
in response to obtaining the first or second reception performance index, determining that the first reception quality of the second service is below a threshold reception quality, comprising:
determining a minimum bitrate cap for the second service to have a Quality-of-Experience greater than a threshold Quality-of-Experience;
determining a plurality of bitrate caps for the first service, wherein each bitrate cap of the plurality of bitrate caps is determined for the first service to have a download time less than a threshold download time;
performing a first level check, comprising determining if an average bitrate over an immediately preceding period is greater than one or more threshold bitrates, each threshold bitrate of the one or more threshold bitrates comprising the minimum bitrate cap for the second service added to a respective bitrate cap of the plurality of bitrate caps for the first service;
in response to determining that the average bitrate over the immediately preceding period is greater than the one or more threshold bitrates, after a first time interval, repeating the performing of the first level check;
in response to determining that the average bitrate over the immediately preceding period is not greater than the one or more threshold bitrates, performing a second level check, comprising determining whether the average bitrate is lower than the one or more threshold bitrates by a predetermined percentage and whether error events or rebuffering events have occurred;
in response to determining that the average bitrate over the immediately preceding period is not lower than the one or more threshold bitrates by the predetermined percentage and that error events and rebuffering events have not have occurred, after a second time interval less than the first time interval, repeating the performing of the first level check; and
in response to determining that the average bitrate over the immediately preceding period is lower than the one or more threshold bitrates by the predetermined percentage or that error events or rebuffering events have occurred, determining an updated transmission rate for the first service based on whether a highest bitrate cap of the plurality of bitrate caps of the first service allows twice a gap between the average bitrate over the immediately preceding period and the one or more threshold bitrates to be recouped for transmission of the second service; and
in response to determining the updated transmission rate for the first service;
while transmitting the second service, transmitting, using said content distribution device, said first service at the updated transmission rate, the updated transmission rate configured such that the second service is received at a second reception quality higher than the threshold reception quality, the updated transmission rate being higher than zero.

2. Method according to claim 1, wherein determining said updated transmission rate comprises determining said updated transmission rate also on a basis of a predetermined transmission rate associated with the second service.

3. Method according to claim 1, wherein determining said updated transmission rate for said first service comprises decreasing or increasing said updated transmission rate in correspondence with a decrease or, correspondingly, increase in the first or second reception performance index.

4. Method according to claim 1, comprising a step of setting the updated transmission rate for the first service in correspondence with a transmitter of the content distribution device.

5. Method according to claim 1, wherein the transmitting said first service at the updated transmission rate comprises, based on dynamically determining the updated transmission rate:
at a first time, transmitting, by means of said content distribution device, said first service at a first updated transmission rate higher than zero; and
at a second time, transmitting, by means of said content distribution device, said first service at a second updated transmission rate higher than zero and different from the first updated transmission rate.

6. Method according to claim 1, wherein the telemetry data comprise electronic information on a plurality or all the services delivered to one or more of the devices associated with the user, by a plurality of content distribution devices.

7. Method according to claim 1, wherein the telemetry data is limited to some or all of the services supplied by the content distribution device.

8. Entity for distributing, by a communication network, at least one audiovisual service to a user terminal associated with a network user point, the entity comprising:
a transmitter configured to transmit, to said network user point, at least a first service and a second service, said first service comprising an audiovisual service intended for deferred fruition and said second service comprising an audiovisual service intended for fruition while it is being transmitted to the network user point;
a receiver configured to:
when the network user point is associated with only one user terminal collecting telemetry data, receiving, from said network user point, a first reception performance index calculated at said network user point, the first reception performance index comprising an indication of a first reception quality of the second service; and
when the network user point is associated with a plurality of user terminals collecting telemetry data, receive the telemetry data from said network user point, telemetry data collected at the plurality of user terminals associated with the network user point, the telemetry data including, for each user terminal of the plurality of user terminals, at least one of measurement on a bitrate of one or more audiovisual services received from the user terminal, information on rebuffering, a start-up time of an audiovisual service, an indication of errors, or an indication of a resolution used by the user terminal;
a processor configured to, when the network user point is associated with the plurality of user terminals collecting telemetry data, determine, remote from said network user point a second reception performance index relating to said network user point based on the telemetry data for each user terminal of the plurality of user terminals, the second reception performance index comprising the indication of the first reception quality of the second service,
wherein the processor is configured to, in response to obtaining the first or second reception performance index, determine that the first reception quality of the second service is below a threshold reception quality, comprising:
determining a minimum bitrate cap for the second service to have a Quality-of-Experience greater than a threshold Quality-of-Experience;
determining a plurality of bitrate caps for the first service, wherein each bitrate cap of the plurality of bitrate caps is determined for the first service to have a download time less than a threshold download time;
performing a first level check, comprising determining if an average bitrate over an immediately preceding period is greater than one or more threshold bitrates, each threshold bitrate of the one or more threshold bitrates comprising the minimum bitrate cap for the second service added to a respective bitrate cap of the plurality of bitrate caps for the first service;
in response to determining that the average bitrate over the immediately preceding period is greater than the one or more threshold bitrates, after a first time interval, repeating the performing of the first level check;
in response to determining that the average bitrate over the immediately preceding period is not greater than the one or more threshold bitrates, performing a second level check, comprising determining whether the average bitrate is lower than the one or more threshold bitrates by a predetermined percentage and whether error events or rebuffering events have occurred;
in response to determining that the average bitrate over the immediately preceding period is not lower than the one or more threshold bitrates by the predetermined percentage and that error events and rebuffering events have not have occurred, after a second time interval less than the first time interval, repeating the performing of the first level check; and
in response to determining that the average bitrate over the immediately preceding period is lower than the one or more threshold bitrates by the predetermined percentage or that error events or rebuffering events have occurred, determining an updated transmission rate for the first service based on whether a highest bitrate cap of the plurality of bitrate caps of the first service allows twice a gap between the average bitrate over the immediately preceding period and the one or more threshold bitrates to be recouped for transmission of the second service; and
wherein, in response to the processor determining the updated transmission rate for the first service;
the transmitter is configured to, while transmitting the second service, transmit said first service at the updated transmission rate, the updated transmission rate configured such that the second service is received at a second reception quality higher than the threshold reception quality, the updated transmission rate being higher than zero.

9. Entity according to claim 8, wherein the processor is configured to set the updated transmission rate for the first service at said network user point.

10. A system comprising an entity according to claim 8, and at least one user terminal connectable to such entity by a communication network.

11. At least one non-transitory computer-readable storage medium having stored thereon a computer program configured to execute, when said computer program is run on a computer, a method for distributing, from a content distribution device and by a communication network, at least one audiovisual service to a user terminal associated with a network user point, the method comprising steps of:
- transmitting, to said network user point, at least a first service and a second service, said first service comprising an audiovisual service intended for deferred fruition and said second service comprising an audiovisual service intended for fruition while it is transmitted to the network user point;
- when the network user point is associated with only one user terminal collecting telemetry data, receiving, from said network user point, a first reception performance index calculated at said network user point, the first reception performance index comprising an indication of a first reception quality of the second service;
- when the network user point is associated with a plurality of user terminals collecting telemetry data:
  - receiving, from said network user point, the telemetry data collected at the plurality of user terminals associated with the network user point, the telemetry data including, for each user terminal of the plurality of user terminals, at least one of measurement on a bitrate of one or more audiovisual services received from the user terminal, information on rebuffering, a start-up time of an audiovisual service, an indication of errors, or an indication of a resolution used by the user terminal; and
  - determining, remote from said network user point, a second reception performance index relating to said network user point based on the telemetry data for each user terminal of the plurality of user terminals, the second reception performance index comprising the indication of the first reception quality of the second service;
- in response to obtaining the first or second reception performance index, determining that the first reception quality of the second service is below a threshold reception quality, comprising:
  - determining a minimum bitrate cap for the second service to have a Quality-of-Experience greater than a threshold Quality-of-Experience;
  - determining a plurality of bitrate caps for the first service, wherein each bitrate cap of the plurality of bitrate caps is determined for the first service to have a download time less than a threshold download time;
  - performing a first level check, comprising determining if an average bitrate over an immediately preceding period is greater than one or more threshold bitrates, each threshold bitrate of the one or more threshold bitrates comprising the minimum bitrate cap for the second service added to a respective bitrate cap of the plurality of bitrate caps for the first service;
  - in response to determining that the average bitrate over the immediately preceding period is greater than the one or more threshold bitrates, after a first time interval, repeating the performing of the first level check;
  - in response to determining that the average bitrate over the immediately preceding period is not greater than the one or more threshold bitrates, performing a second level check, comprising determining whether the average bitrate is lower than the one or more threshold bitrates by a predetermined percentage and whether error events or rebuffering events have occurred;
  - in response to determining that the average bitrate over the immediately preceding period is not lower than the one or more threshold bitrates by the predetermined percentage and that error events and rebuffering events have not have occurred, after a second time interval less than the first time interval, repeating the performing of the first level check; and
  - in response to determining that the average bitrate over the immediately preceding period is lower than the one or more threshold bitrates by the predetermined percentage or that error events or rebuffering events have occurred, determining an updated transmission rate for the first service based on whether a highest bitrate cap of the plurality of bitrate caps of the first service allows twice a gap between the average bitrate over the immediately preceding period and the one or more threshold bitrates to be recouped for transmission of the second service; and
- in response to determining the updated transmission rate for the first service;
  - while transmitting the second service, transmitting, using said content distribution device, said first service at the updated transmission rate, the updated transmission rate configured such that the second service is received at a second reception quality higher than the threshold reception quality, the updated transmission rate being higher than zero.

* * * * *